United States Patent
Mizuguchi et al.

(10) Patent No.: US 8,111,309 B2
(45) Date of Patent: Feb. 7, 2012

(54) SOLID-STATE IMAGE PICKUP DEVICE AND SIGNAL PROCESSING METHOD USING SOLID-STATE IMAGE PICKUP DEVICE

(75) Inventors: Toshitaka Mizuguchi, Kawasaki (JP); Tsuyoshi Higuchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 882 days.

(21) Appl. No.: 12/130,344

(22) Filed: May 30, 2008

(65) Prior Publication Data

US 2008/0297636 A1    Dec. 4, 2008

(30) Foreign Application Priority Data

May 31, 2007    (JP) .................................. 2007-145505

(51) Int. Cl.
*H04N 3/14* (2006.01)
*H04N 5/335* (2006.01)

(52) U.S. Cl. ....................................... 348/294; 348/302

(58) Field of Classification Search .................. 348/294, 348/302

See application file for complete search history.

(56) References Cited

U.S. PATENT DOCUMENTS

| | | | |
|---|---|---|---|
| 7,145,494 B2 | 12/2006 | Mizuguchi et al. | |
| 7,522,199 B2 | 4/2009 | Funakoshi et al. | |
| 7,679,661 B2 * | 3/2010 | Kondo | 348/294 |
| 2004/0233311 A1 | 11/2004 | Throngnumchai | |
| 2005/0206548 A1 | 9/2005 | Muramatsu et al. | |
| 2006/0114342 A1 | 6/2006 | Egawa | |

FOREIGN PATENT DOCUMENTS

| | | |
|---|---|---|
| JP | 2004-349952 A | 12/2004 |
| JP | 2006-020171 | 1/2006 |
| JP | 2006-157263 A | 6/2006 |
| JP | 2006-217304 | 8/2006 |
| KR | 10-2006-0002700 A | 1/2006 |
| KR | 1020060052524 A | 5/2006 |
| KR | 10-0649066 B1 | 11/2006 |

* cited by examiner

*Primary Examiner* — William Choi
(74) *Attorney, Agent, or Firm* — Arent Fox LLP

(57) ABSTRACT

A solid-state image pickup device having a reduced signal transfer time and a signal processing method using the solid-state image pickup device. A pixel array includes a plurality of light-receiving pixel elements and a plurality of light-blocked pixel elements. A read block reads the output signals of the plurality of light-blocked pixel elements. An AD conversion processing block includes a circuit for summing up the output signals of adjacent light-blocked pixel elements and transferring the signals of the light-blocked pixel elements in a reduced period.

10 Claims, 6 Drawing Sheets

SOLID-STATE IMAGE PICKUP DEVICE AND SIGNAL PROCESSING METHOD USING SOLID-STATE IMAGE PICKUP DEVICE

CROSS-REFERENCE TO RELATED APPLICATIONS

This application is based upon and claims the benefits of priority from the prior Japanese Patent Application No. 2007-145505, filed May 31, 2007, the entire contents of which are incorporated herein by reference.

BACKGROUND

1. Field

The embodiments discussed herein are directed to solid-state image pickup devices and signal processing methods using a solid-state image pickup device, which may be direct to a solid-state image pickup device that processes signals of each row or each column and a signal processing method using the solid-state image pickup device.

2. Description of the Related Art

Solid-state image pickup devices such as charge coupled device (CCD) image sensors and CMOS image sensors have gained attention in recent years.

A typical solid-state image pickup device reads one row of a pixel array at a time, performs AD conversion of the read result of each pixel, and transfers the results of conversion sequentially to a signal processor or to the outside (refer to Japanese Unexamined Patent Application Publication Nos. 2006-20171 and 2006-217304, for instance).

The frame rate of each image sensor is inversely proportional to the number of pixels. A single pixel row includes several tens of light-blocked pixels, which do not respond to light. Those pixels are read together with light-receiving pixels, and the results are averaged to reduce noise or dark current.

The miniaturization of pixels has reduced the S/N ratio recently. This has increased the number of light-blocked pixels needed per line, increasing the transfer time accordingly and decreasing the frame rate per clock cycle. The transfer time has become a bottleneck. If the clock speed is increased to reduce the transfer time, clock noise would increase.

SUMMARY

It is an aspect of the embodiments discussed herein to provide a solid-state image pickup device that processes signals of each row or each column, including: a pixel array comprising a plurality of light-receiving pixel elements and a plurality of light-blocked pixel elements; a read block for reading output signals of the plurality of light-receiving pixel elements and the plurality of light-blocked pixel elements; and an AD conversion processing block for transferring the sum of the output signals of a plurality of adjacent light-blocked pixel elements, the AD conversion processing block comprising an AD conversion block for performing AD conversion of the output signals sent from the read block.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

An embodiment will be described in detail with reference to the drawings.

An outline of the embodiment will be given first. Then, the embodiment will be described.

Figure 1:
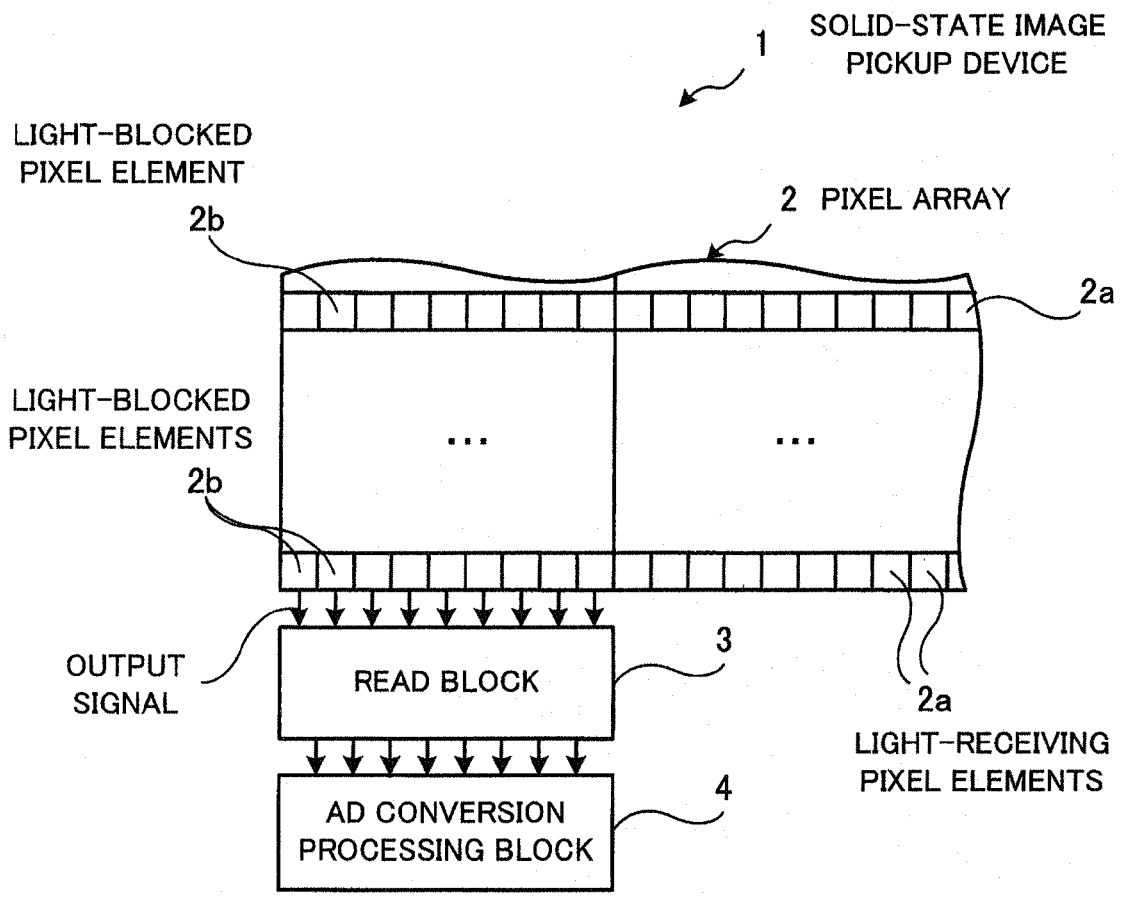
FIG. 1 shows an outline.

FIG. 1 shows the outline of the embodiment.

A solid-state image pickup device 1 includes a pixel array 2, a read block 3, and an AD conversion processing block 4.

The pixel array 2 includes a plurality of light-receiving pixel elements 2a and a plurality of light-blocked pixel elements 2b.

The read block 3 reads the output signals of the light-blocked pixel elements 2b.

The AD conversion processing block 4 sums up the output signals of adjacent light-blocked pixel elements 2b and performs processing for transferring the signals of the light-blocked pixel elements 2b in a reduced period.

In the solid-state image pickup device 1, the read block 3 reads the output signals of the light-blocked pixel elements 2b from the pixel array 2. The AD conversion processing block 4 generates a signal that can be transferred in a shorter period by summing up the output signals of the adjacent light-blocked pixel elements 2b.

The embodiment will be described.

Figure 2:
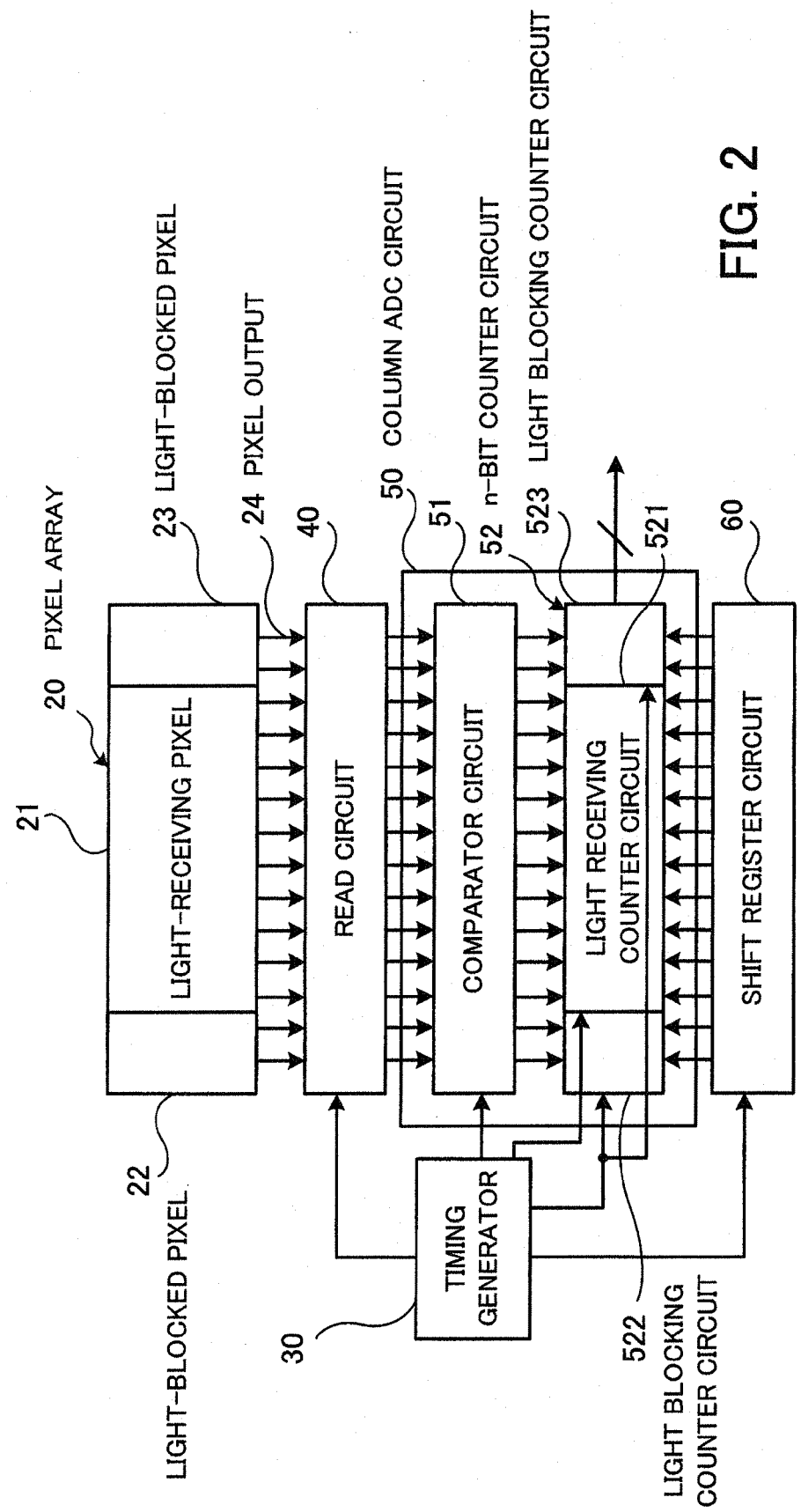
FIG. 2 is a block diagram showing a solid-state image pickup device of an embodiment.

FIG. 2 is a block diagram showing a solid-state image pickup device 10 of the embodiment.

The solid-state image pickup device 10 includes a pixel array 20 having a plurality of pixels arranged two-dimensionally in rows and columns, a timing generator 30, a read circuit 40, a column ADC circuit 50, and a shift register circuit 60.

The pixel array 20 includes light-receiving pixels 21 and light-blocked pixels 22 and 23, which do not respond to light.

Each light-receiving pixel 21 is formed, for instance, by a photodiode serving as a photoelectric conversion element, a transistor for initializing the photodiode, amplifying the output signal, and controlling the timing, and the like. Each pixel is covered by a color filter of one of the three primary colors of light and performs photoelectric conversion of the color.

The timing generator 30 outputs timing signals to the read circuit 40, the column ADC circuit 50, and the shift register circuit 60 to synchronize those circuits.

The read circuit 40, the column ADC circuit 50, and the shift register circuit 60 operate correspondingly to each column of the light-receiving pixels 21 and the light-blocked pixels 22 and 23.

The read circuit 40 selects and reads the pixel outputs 24 of the light-receiving pixels 21 and the light-blocked pixels 22 and 23 of each column separately.

The read circuit 40 also performs correlated double sampling to execute processing to eliminate noise occurring in the pixel output 24 at a reset of the photoelectric conversion element or the like, from the photoelectric conversion signal.

The column ADC circuit 50 includes a comparator circuit 51 and an n-bit counter circuit 52 (n=1, 2, ...) which operate with a common clock signal.

The comparator circuit 51 compares the pixel output 24 read by the read circuit 40 with a reference voltage and, if the pixel output voltage exceeds the reference voltage, sends a signal to the n-bit counter circuit 52 to stop counting.

The n-bit counter circuit 52 uses the signal sent from the comparator circuit 51 to perform processing for digitizing the photoelectric conversion signal, as will be described later. The signals corresponding to the pixel outputs 24 of the light-receiving pixels 21 are input to a light receiving counter circuit 521, and the signals corresponding to the pixel outputs 24 of the light-blocked pixels 22 and 23 are input to light blocking counter circuits 522 and 523, respectively.

The shift register circuit 60 is provided to read sequentially the values of latch circuits, which will be described later.

In the solid-state image pickup device 10 structured as described above, the read circuit 40 reads the pixel outputs 24 of the light-receiving pixels 21 and the light-blocked pixels 22 and 23 in accordance with a timing signal given by the timing generator 30. Then, the read pixel output is input to the comparator circuit 51 and is compared with the reference voltage. The signal obtained as a result of the comparison is input to the n-bit counter circuit 52. The n-bit counter circuit 52 performs digitization processing and outputs resultant digital signals sequentially.

The processing of the signal input to the light receiving counter circuit 521 will be described next. In the description below, it is assumed that n=3 and the maximum voltage of the pixel output 24 is 1 V, for instance.

Figure 3:
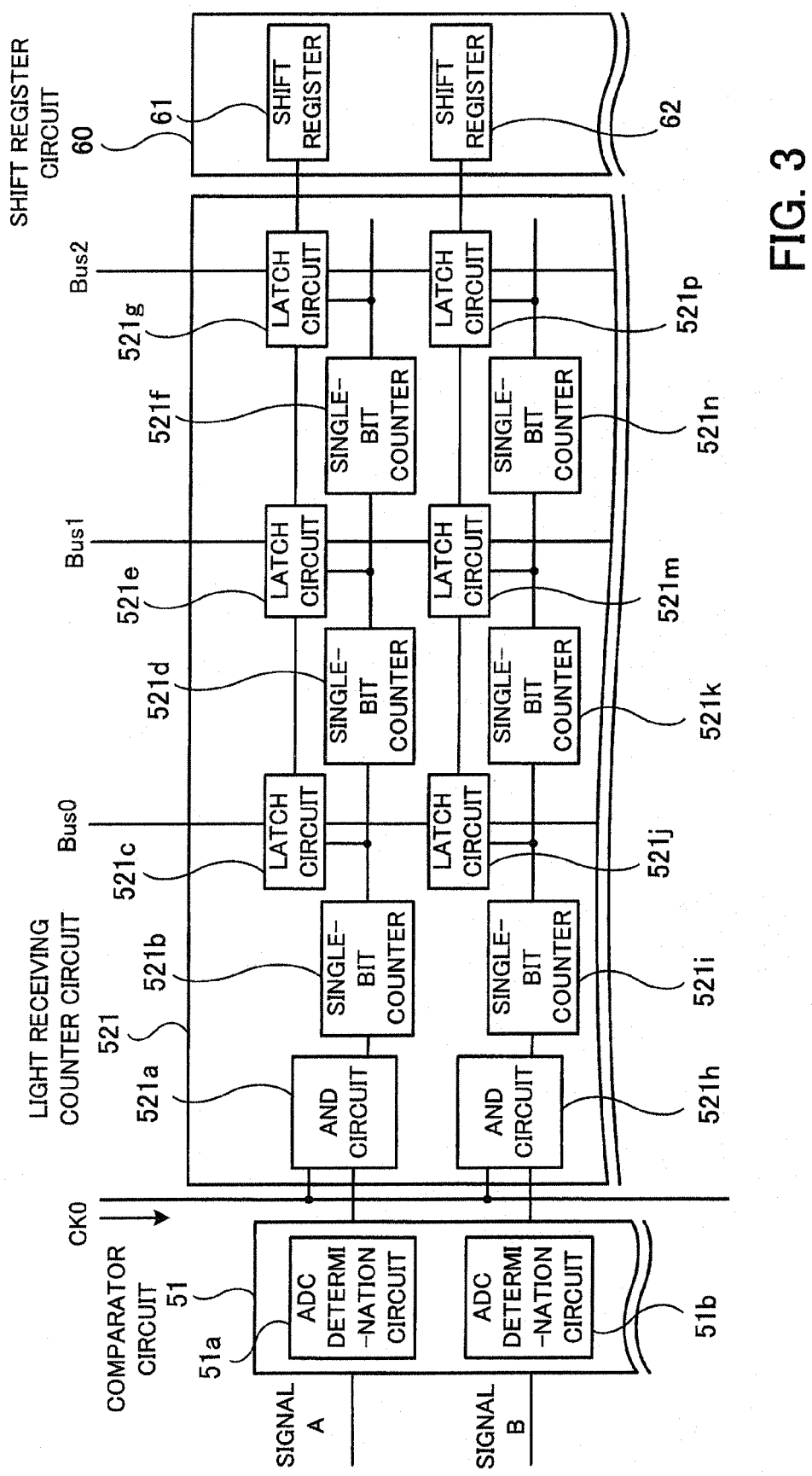
FIG. 3 is a block diagram illustrating signal processing in a light receiving counter circuit.

FIG. 3 is a block diagram illustrating the signal processing in the light receiving counter circuit 521.

The comparator circuit 51 includes ADC determination circuits 51a, 51b, and so on, which are disposed depending on the number of the light-receiving pixels 21. In the following description, a pixel signal input to the ADC determination circuit 51a will be denoted as signal A, and a pixel signal input to the ADC determination circuit 51b will be denoted as signal B.

The ADC determination circuits 51a and 51b make determination separately in accordance with the pixel output 24 and the reference voltage, and the light receiving counter circuit 521 counts $2^n$, which is 0 (0 V) to 8 (1 V) when n=3. Each of the ADC determination circuits 51a and 51b keeps outputting "1" until the voltage value of the pixel output 24 exceeds the reference voltage value. When the voltage value of the pixel output 24 exceeds the reference voltage value, the circuit outputs "0" to stop the counting by the light receiving counter circuit 521.

The light receiving counter circuit 521 includes an AND circuit 521a for taking an AND of the output of the ADC determination circuit 51a and an ADC clock CK0, a single-bit counter 521b for counting the output signal of the AND circuit 521a, a latch circuit 521c for latching the output signal of the single-bit counter 521b, a single-bit counter 521d for counting the output signal of the single-bit counter 521b, a latch circuit 521e for latching the output signal of the single-bit counter 521d, a single-bit counter 521f for counting the output signal of the single-bit counter 521d, and a latch circuit 521g for latching the output signal of the single-bit counter 521f. The single-bit counters 521b, 521d, and 521f are each formed by a D-type flip-flop.

The light receiving counter circuit 521 also includes an AND circuit 521h, single-bit counters 521i, 521k, and 521n, and latch circuits 521j, 521m, and 521p, for processing the signal B in the same way as the signal A.

The shift register circuit 60 includes a shift register 61 for selecting and reading the values latched by the latch circuits 521c, 521e, and 521g sequentially into a color signal processing circuit (not shown) in the subsequent stage and a shift register 62 for selecting and reading the values latched by the latch circuits 521j, 521m, and 521p sequentially into the color signal processing circuit in the subsequent stage.

The values of the latch circuits 521c and 521j are read from bus 0; the values of the latch circuits 521e and 521m are read from bus 1, and the values of the latch circuits 521g and 521p are read from bus 2.

Figure 4A:
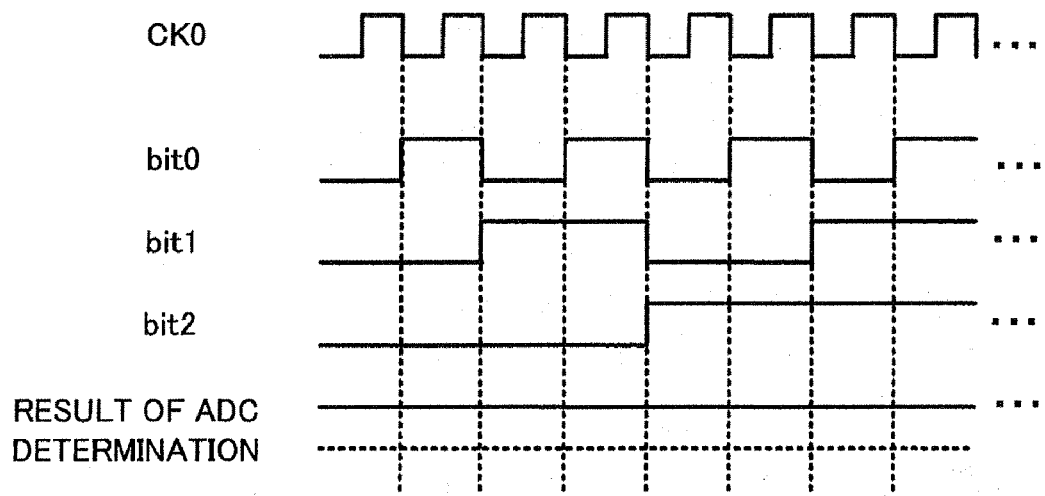
FIGS. 4A and 4B show digital values obtained by the circuit shown in FIG. 3.
Figure 4B:
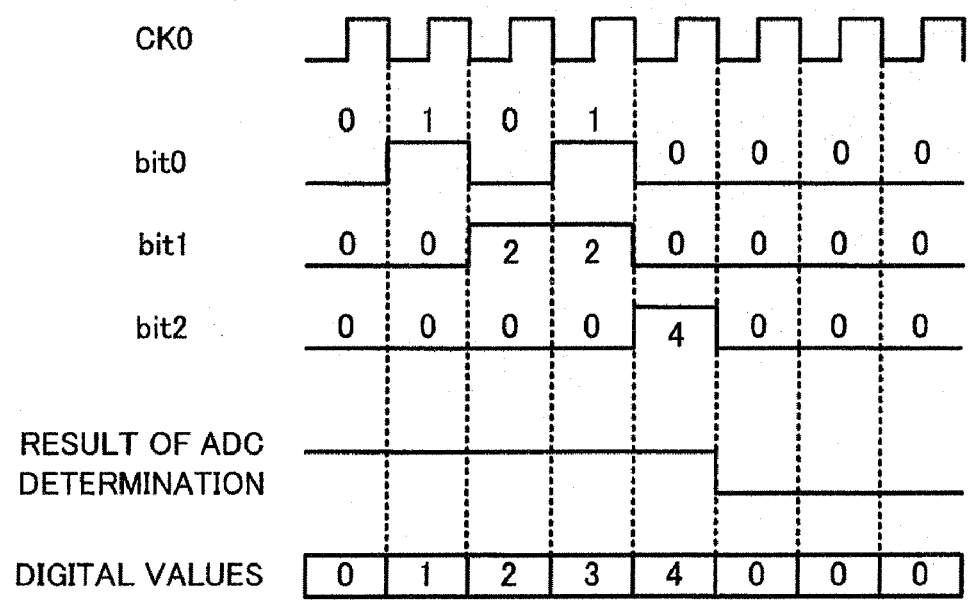

FIGS. 4A and 4B show digital values obtained by the circuit shown in FIG. 3.

In FIGS. 4A and 4B, bit 0 indicates the output value of the single-bit counter 521b (the value stored in the latch circuit 521c); bit 1 indicates the output value of the single-bit counter 521d (the value stored in the latch circuit 521e); and bit 2 indicates the output value of the single-bit counter 521f (the value stored in the latch circuit 521g).

As shown in FIG. 4A, while the ADC determination circuit 51a is outputting "1", the output values of the single-bit counters 521b, 521d, and 521f change in accordance with the ADC clock CK0.

FIG. 4B shows statuses when the output value of the ADC determination circuit 51a changes.

The shift register 61 starts operating in accordance with a timing signal output from the timing generator 30 and reads the values stored in the latch circuits 521c, 521e, and 521g.

A digital value is obtained by performing signal processing in accordance with the weight of the read value. More specifically, the digital value is obtained by taking "1" in bit 0 as "1" ($2^0$), "1" in bit 1 as "2" ($2^1$), and "1" in bit 2 as "4" ($2^2$) and summing up those values. In the example shown in FIG. 4B, 0+0+4=4 is obtained.

The processing of the signals input to the light blocking counter circuits 522 and 523 will next be described.

Figure 5:
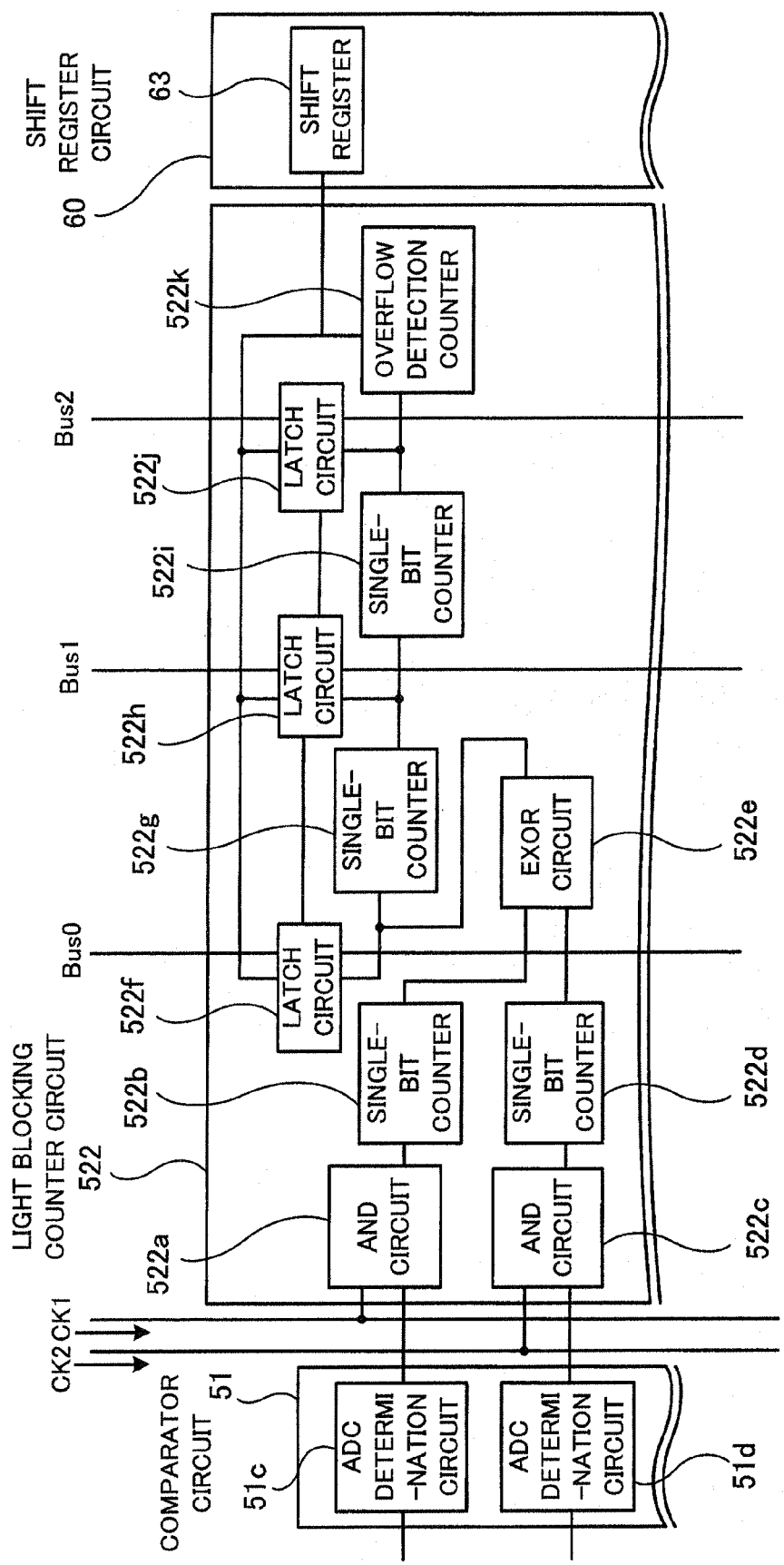
FIG. 5 is a block diagram illustrating signal processing in a light blocking counter circuit.

FIG. 5 is a block diagram illustrating the signal processing in the light blocking counter circuits 522 and 523. The light blocking counter circuits 522 and 523 have the same structure, and the structure of the light blocking counter circuit 522 will be described.

The comparator circuit 51 includes ADC determination circuits 51c, 51d, and so on, which are disposed depending on the number of the light-blocked pixels 22. The ADC determination circuits 51c, 51d, and so on have the same function as the ADC determination circuits 51a, 51b, and so on.

The light blocking counter circuit 522 includes an AND circuit 522a for taking an AND of the output of the ADC determination circuit 51c and an ADC clock CK1, a single-bit counter 522b for counting the output signal of the AND circuit 522a, an AND circuit 522c for taking an AND of the ADC determination circuit 51d and an ADC clock CK2, a single-bit counter 522d for counting the output signal of the AND circuit 522c, an EXOR circuit 522e for taking an exclusive OR (EXOR) of the value of the single-bit counter 522b and the value of the single-bit counter 522d, a latch circuit 522f for latching the output signal of the EXOR circuit 522e, a single-bit counter 522g for counting the output signal of the EXOR circuit 522e, a latch circuit 522h for latching the output signal of the single-bit counter 522g, a single-bit counter 522i for counting the output signal of the single-bit counter 522g, a latch circuit 522j for latching the output signal of the single-bit counter 522i, and an overflow detection counter (overflow detection block) 522k. The single-bit counters 522b, 522g, and 522i are each formed by a D-type flip-flop, for instance. The AND circuits 522a and 522c, the single-bit counters 522b and 522d, and the EXOR circuit 522e form a common signal generation block.

The shift register circuit 60 includes a shift register (selection circuit) 63 for reading the values latched by the latch circuits 522f, 522h, and 522j sequentially.

Figure 6:
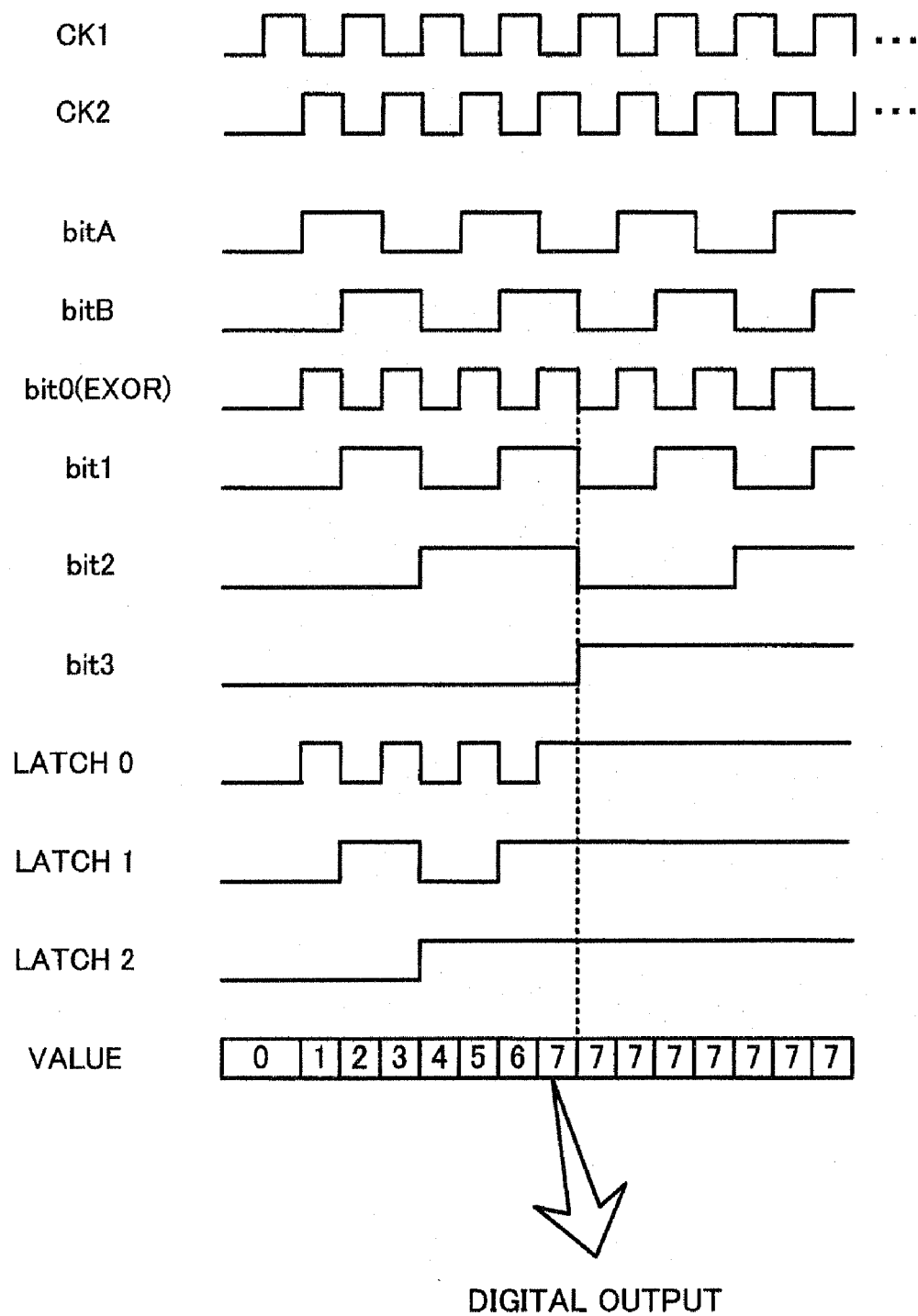
FIG. 6 shows digital values obtained by the circuit shown in FIG. 5.

FIG. 6 shows digital values obtained by the circuit shown in FIG. 5.

The operation will be described with reference to FIGS. 5 and 6.

In FIG. 6, bit A represents the value of the single-bit counter 522b; bit B represents the value of the single-bit counter 522d; bit 0 (EXOR) represents the output value of the EXOR circuit 522e; bit 1 represents the output value of the single-bit counter 522g; bit 2 represents the output value of the single-bit counter 522i; bit 3 represents the output value of the overflow detection counter 522k; latch 0 represents the value stored in the latch circuit 522f; latch 1 represents the value stored in the latch circuit 522h; and latch 2 represents the value stored in the latch circuit 522j.

As shown in FIG. 6, the cycles of the ADC clocks CK1 and CK2 are shifted from each other by half a clock cycle. This causes a shift of half a clock cycle between the signals counted by the single-bit counters 522b and 522d. The EXOR circuit 522e takes an exclusive OR of these signals and outputs a signal (AD conversion signal) having a half of the cycle of the output signals of the single-bit counters 522b and 522d. This value is stored in the latch circuit 522f. The single-bit counter 522g divides, in frequency, the signal output from the EXOR circuit 522e by two and outputs the result. The result is stored in the latch circuit 522h. The output signal of the single-bit counter 522i is stored in the latch circuit 522j.

When an input of "1" to the overflow detection counter 522k brings the output signal of the overflow detection counter 522k to "1", the values of the latch circuits 522f, 522h, and 522j are latched by the overflow detection counter 522k forcibly.

The shift register 63 starts operating in accordance with a timing signal output from the timing generator 30 and reads the values stored in the latch circuits 522f, 522h, and 522j. The way of reading is the same as that described with reference to FIG. 4 and will not be described here.

With the circuit structured as described above, the output values of the ADC determination circuits 51c and 51d can be added, and the output values of the ADC determination circuits 51c and 51d can be read in a single read period, as shown in FIG. 6, so that the read time can be reduced.

As has been described above, the solid-state image pickup device 10 of the embodiment has the light blocking counter circuits 522 and 523 to sum up the output signals of adjacent light-blocked pixels. Accordingly, the transfer time of the values of the light-blocked pixels can be reduced, and the frame rate per clock cycle can be increased. In other words, the data transfer period can be reduced without changing the frame rate. This eliminates the need for increasing the clock speed, so that clock noise becomes smaller than when the clock speed is increased to reduce the transfer time.

Because a common counter circuit can be used for adjacent ADC determination circuits, a smaller circuit footprint is used.

Because the output signals are summed up, the single-bit counters 522g and 522i count at twice the speeds of the single-bit counters 521d and 521f, respectively. In the example shown in FIG. 6, while the light receiving counter circuit 521 counts from 0 to 7, the light blocking counter circuits 522 and 523 count from 0 to 14. Therefore, the single-bit counters of the light blocking counter circuits 522 and 523 would overflow while the light receiving counter circuit 521 keeps counting. The overflow detection counter 522k helps prevent overflow.

Because the light-blocked pixels produce a black level, the values of the ADC determination circuits 51c and 51d change from "1" to "0" before the overflow detection counter 522k latches the values of the latch circuits 522f, 522h, and 522j forcibly. Therefore, no extra circuit is required. The output signals of the light-blocked pixels are averaged conventionally in the color signal processing circuit (not shown) in the subsequent stage, so that no special circuit is needed in the color signal processing circuit in the subsequent stage.

In the embodiment, the light blocking counter circuits 522 and 523 take and process an exclusive OR of the output signals of two pixels. The present embodiment is not limited to that structure, and the circuits may be structured to take and process an exclusive OR of the output signals of an even number of pixels such as four pixels and eight pixels.

In the embodiment, the overflow detection counter 522k latches the values of the latch circuits 522f, 522h, and 522j forcibly when overflow is detected. The values of the latch circuits 522f, 522h, and 522j may be rewritten to "1".

With the present embodiment, the output signals of the plurality of adjacent light-blocked pixel elements are summed up to generate a transfer signal, so that the signal transfer time can be reduced.

The foregoing is considered as illustrative only of the principles of the present embodiment. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A solid-state image pickup device that processes signals of each row or each column, comprising:
   a pixel array comprising a plurality of light-receiving pixel elements and a plurality of light-blocked pixel elements;
   a read block for reading output signals of the plurality of light-receiving pixel elements and the plurality of light-blocked pixel elements; and
   an AD conversion processing block for transferring the sum of the output signals of a plurality of adjacent light-blocked pixel elements, the AD conversion processing block comprising an AD conversion block for performing AD conversion of the output signals sent from the read block.

2. The solid-state image pickup device according to claim 1, wherein the AD conversion processing block comprises a counter circuit comprising:
   a plurality of bit counters for use in AD conversion of an AD conversion signal;
   a plurality of latch circuits for latching values of the plurality of bit counters; and
   a scanning circuit for selecting and reading the values latched by the plurality of latch circuits.

3. The solid-state image pickup device according to claim 2, wherein the counter circuit comprises an overflow detection block which sets the values of the plurality of latch circuits to "1" when it detects that the values of the plurality of bit counters latched by the plurality of latch circuits are all "1".

4. The solid-state image pickup device according to claim 3, wherein the counter circuit comprises a plurality of frequency-divided-signal generation circuits for dividing, in frequency, the output signals to generate frequency-divided signals in accordance with clocks shifted by half a cycle from each other, and an EXOR circuit for taking an exclusive OR of the frequency-divided signals; and the AD conversion processing block comprises another counter circuit comprising a plurality of bit counters for determining the value of each bit by dividing, in frequency, the output signal of the EXOR circuit in AD conversion of the AD conversion signal, a plurality of latch circuits for latching the values of the plurality of bit counters, and a scanning circuit for selecting and reading the values latched by the plurality of latch circuits.

5. The solid-state image pickup device according to claim 1, wherein the AD conversion processing block comprises:

a plurality of bit counters for use in AD conversion of a signal obtained by summing up the output signals of the plurality of adjacent light-blocked pixel elements;

a plurality of latch circuits for latching the values of the plurality of bit counters; and a selection circuit for selecting and reading the values latched by the plurality of latch circuits.

6. The solid-state image pickup device according to claim 5, wherein the plurality of latch circuits and the selection circuit collectively process the output signals of light-blocked pixel elements in a single column.

7. The solid-state image pickup device according to claim 5, wherein the AD conversion processing block comprises an overflow detection block for setting the values of the plurality of latch circuits to "1" when it detects that the values of the plurality of bit counters latched by the plurality of latch circuits are all "1".

8. The solid-state image pickup device according to claim 1, wherein the AD conversion processing block comprises a plurality of determination circuits each provided for each column of the plurality of light-blocked pixel elements, each for outputting a signal until the output signal of a corresponding light-blocked pixel element exceeds a reference voltage, a plurality of signal generation circuits each provided for each of the plurality of determination circuits, each for counting the output signal of a corresponding determination circuit, and an EXOR circuit for taking an exclusive OR of the signals counted by the plurality of signal generation circuits; and the AD conversion processing block comprises a plurality of bit counters for counting the output signal of the EXOR signal in AD conversion, a plurality of latch circuits for latching the values of the plurality of bit counters, and a selection circuit for selecting and reading the values latched by the plurality of latch circuits.

9. The solid-state image pickup device according to claim 8, wherein the plurality of signal generation circuits count the output signals of the plurality of determination circuits in accordance with clock signals shifted by half a cycle from each other.

10. A signal processing method using a solid-state image pickup device that processes signals of each row or each column, the signal processing method comprising the steps of:

reading, by a read block, the output signals of a plurality of light-blocked pixel elements of a pixel array having a plurality of light-receiving pixel elements and the plurality of light-blocked pixel elements; and summing up, by an AD conversion processing block, the output signals of a plurality of adjacent light-blocked pixel elements.

* * * * *